Sept. 19, 1933.  A. C. BOOTH  1,927,698
FRUIT PACKING DEVICE
Filed March 6, 1931
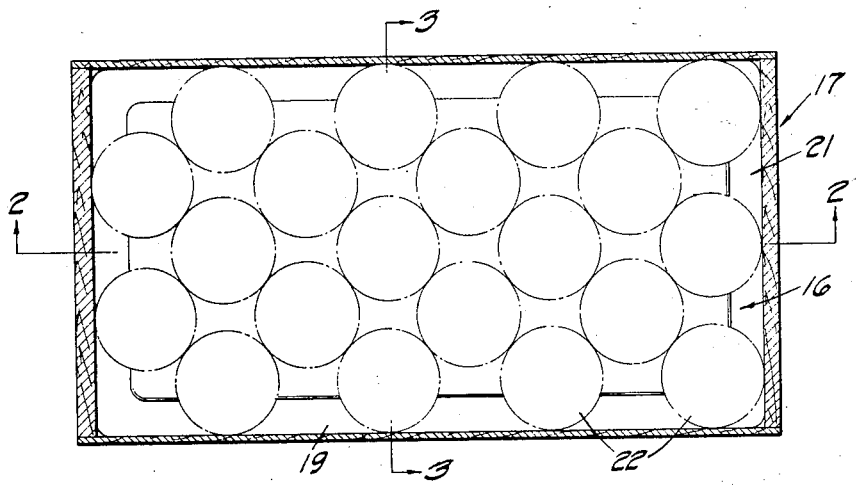
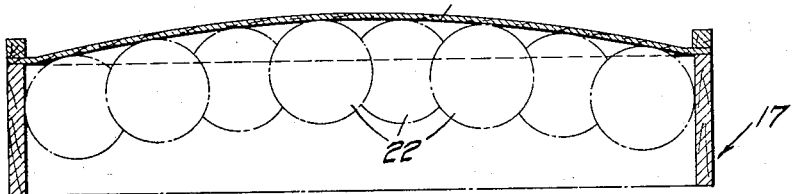
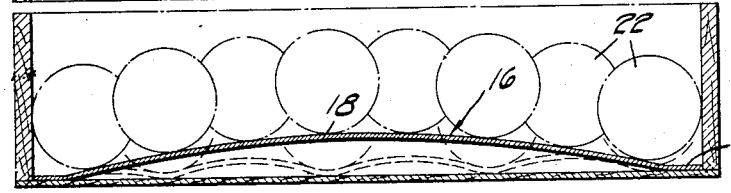
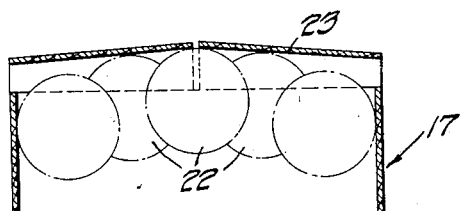
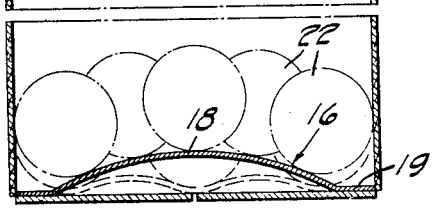
INVENTOR.
AUGUSTUS C. BOOTH
BY
ATTORNEYS.

Patented Sept. 19, 1933

1,927,698

UNITED STATES PATENT OFFICE 1,927,698

FRUIT PACKING DEVICE

Augustus C. Booth, San Francisco, Calif.

Application March 6, 1931. Serial No. 520,601

5 Claims. (Cl. 217—3)

My invention relates to means for facilitating the packing of fruit and more specifically to means for insuring a tight pack for fruit which is easily bruised, such as apples and pears.

In shipping fruit of the above character, it is important that the fruit be packed tightly, otherwise shaking and rattling of the same will cause bruises which render the fruit unfit for consumption and subject the fruit to a more rapid decay. When the fruit is packed tightly, any jarring of the boxes or other receptacles in which the fruit is packed, is uniformly distributed throughout the mass of fruit and since there is no movement of the fruit relative to the box, bruises are maintained at a minimum.

It is known that when apples and the like are packed in arched layers of regular formation they can be shipped for long distances without danger of bruising since each apple is held firmly in place by the adjacent apples. This is known as a crown pack and practically all large packers of pears and apples strive to pack the fruit in this manner. It is apparent that a great degree of skill is required to obtain a proper crown pack since each apple must be carefully and exactly positioned relative to the others in the box. Even among highly skilled workers the percentage of perfectly packed boxes is not high and boxes having a flat pack, known in the art as "rattlers", are numerous in most shipments.

It is a general object of my invention to provide means for facilitating the packing of fruit and to facilitate the attainment of a crown pack.

Another object is to provide a yieldable support adapted to be inserted within a box to insure a perfect crown pack even in the hands of an unskilled worker.

These and other objects and advantages are attained in the embodiment of my invention illustrated in the accompanying drawing, in which:

Fig. 1 is a plan view of a box with the cover removed illustrating the correct formation of a layer of fruit therein when the box is packed properly.

Fig. 2 is a cross sectional view taken on the plane indicated by line 2—2 of Fig. 1, illustrating my novel support and showing how it imparts a crown pack to the fruit.

Fig. 3 is a cross sectional view taken on the plane indicated by line 3—3 of Fig. 1.

In its preferred form my invention comprises an insert or false bottom of yieldable material adapted to rest on the bottom of a box, the insert presenting a convex upper surface toward the interior of the box. The first layer of fruit will have an arched formation corresponding to the curvature of the insert and the subsequent upper layers will follow the crowned contour of the first layer. Preferably, the insert is made of pressed fibrous material, such as paper pulp, or other suitable yieldable or flexible material. When the cover of the box is applied, the yieldable nature of the insert allows the fruit to drop slightly and each layer becomes a self supporting arch, the fruit at the center of each layer serving as the keystone of the arch. In this manner, a perfect crown pack is obtained, each apple in the box being firmly wedged in by the others and there is thus no possibility of shaking or rattling the apples within the box during shipment.

Referring now to the drawing, I have shown an insert 16, formed of suitable yieldable material, which is adapted to rest on the bottom of the box 17. The upper surface 18 of the insert 16 is curved and is convex toward the interior of the box. Preferably, the surface 18 is curved lengthwise and crosswise of the box, thus forming a longitudinal arch and a transverse arch upon which the apples or other fruit can be packed, as illustrated in the drawing.

The longitudinal edge portions 19 and the ends 21 of the insert 16 are preferably flat and all lie in substantially the same plane, thus affording a firm bearing surface for the insert. The flat peripheral edges of the insert also serve to reinforce the structure thus permitting the use of a lighter and thinner material in the construction of the insert 16.

The first layer of apples or other fruit 22 when packed in a box of standard dimensions is laid in the manner shown in Fig. 1, the transverse rows having two and three apples alternately. The next tier or layer is similarly laid, except that each apple is placed directly over the space formed between the apples in the layer below. By this method of packing, the maximum number of apples of a certain size can be packed in a given box. Since each layer is arched or formed with the crown, a greater number of apples will be placed in each layer than could be placed in a flat layer having the same outside dimensions.

A standard box will receive five layers of apples, and after the top layer has been laid, the apples at the ends and sides extend a small distance above the upper edge of the box, while the apples near the middle of the top layer extend for a considerable distance above the upper edge. A spring board cover 23 is then applied over the top layer and is uniformly pressed down upon the apples and is nailed into place. The insert 16, being yieldable, sags under the pressure exerted upon it until the apples drop to the position in which each layer is in the form of a self supporting arch, thus producing the crown pack sought. Each apple when packed in this manner is firmly wedged in between the adjacent apples, and any jarring of the box during shipment serves only to wedge the apples into firmer contact with each other, rather than to loosen the pack as is the case when the apples are packed flat. Frequently, the pressure exerted upon applying the cover 23 causes the lower layers of apples to assume a substantially flat condition, as shown in dotted lines in Figures 2 and 3, or even to bulge slightly in the direction opposite to that in which they were originally laid and the amount of curvature of the several layers increases progressively toward the top, the topmost layer having the most pronounced crown. The yieldable nature of the insert permits the apples to assume this position and the insert thereafter serves as a cushion between the apples and the bottom of the box.

It is to be understood that while the device is particularly suitable for packing apples and pears, it can be employed for packing any other fruit or other articles of similar form requiring a high degree of care in packing.

While I have shown and described a preferred embodiment of my invention, I do not wish to be limited thereto, since the invention as defined in the appended claims can be embodied in a plurality of other forms.

I claim:

1. An insert for boxes of the character described said insert being formed of a sheet of flexible material, the peripheral edges of said insert being flat and all lying substantially in the same plane, the surface of the central portion of said insert being curved longitudinally and transversely of the box in which it is adapted to be placed, and the outline of said curved portion being rectangular in shape, the sides of the rectangle being parallel with the adjacent sides of the box, said insert serving as a guide for packing the contents of the box.

2. In combination with a box, means for facilitating the packing of fruit therein, said means comprising an insertable false bottom formed of sheet material and having a surface bulging toward the interior of the box, said false bottom being collapsible upon the application of a lid which exerts normal pressure against fruit packed in the box.

3. A bottom insert for boxes for facilitating the attainment of a crown pack in the packing of fruit, said insert being formed of sheet material of a yieldable nature and having an arched surface which is convex toward the interior of the box, said insert having sufficient resistance against deformation to support the fruit placed in the box in arched layers prior to the application of a lid on the box, but being readily collapsible under the pressure exerted by the lid, whereby the fruit is caused to assume the formation of a crown pack when the lid is applied.

4. A bottom insert for boxes for facilitating the attainment of a crown pack in the packing of fruit, said insert being formed of yieldable material and presenting a surface which is convex toward the interior of the box, the peripheral edges of said insert lying in a single plane and adapted to abut against the bottom of the box, said insert having sufficient resistance against deformation to support the fruit placed in the box in arched layers prior to the application of a lid on the box, but being readily collapsible under the pressure exerted by the lid, whereby the fruit is caused to assume the formation of a crown pack when the lid is applied.

5. A bottom insert for boxes for facilitating the attainment of a crown pack in the packing of fruit, said insert being formed of yieldable material and presenting a surface which is convex toward the interior of the box, the peripheral edges of said insert lying in a single plane and adapted to abut against the bottom of the box, the convex surface of the insert and the surface upon which the insert rests defining a free and unoccupied air space, said insert having sufficient resistance against deformation to support the fruit placed in the box in arched layers prior to the application of a lid on the box, but being readily collapsible under the pressure exerted by the lid, whereby the fruit is caused to assume the formation of a crown pack when the lid is applied.

AUGUSTUS C. BOOTH.